United States Patent [11] 3,631,483

[72] Inventors Norman A. Ruggles
 Pasadena;
 Irving I. Kaplan, Baltimore, both of Md.
[21] Appl. No. 12,207
[22] Filed Feb. 19, 1970
[45] Patented Dec. 28, 1971
[73] Assignee Westinghouse Electric Corporation
 Pittsburgh, Pa.

[54] SHORT PERSISTENCE RADAR DISPLAY SYSTEM
 11 Claims, 4 Drawing Figs.
[52] U.S. Cl. .................................................... 343/5 SC,
 343/11
[51] Int. Cl. .................................................... G01s 7/04
[50] Field of Search ......................................... 343/5 SC,
 11, 5

[56] References Cited
 UNITED STATES PATENTS
3,230,530 1/1966 Balding ........................ 343/5 SC X
3,277,471 10/1966 Balding ........................ 343/11

Primary Examiner—T. H. Tubbesing
Attorneys—F. H. Henson, E. P. Klipfel and D. Schron ABSTRACT: A low PRF radar system display utilizes a cathode-ray tube having a short persistence time in a television type display. The video signal detected from the radar return signal in the receiver is sampled and converted to digital form, and the digital numbers are integrated over each beamwidth of the antenna pattern during an azimuth scan. The digital results of the integration for each beamwidth are stored in separate stores and are read out nondestructively, so that they may be updated during successive azimuth scans, at the raster rate of the TV display. The sequentially readout contents of the stores are converted to analog format and supplied to appropriate control elements of the cathode-ray tube. The operation to provide a processed video output to the display constitutes video cross-correlation and storage and permits use of the television type display.

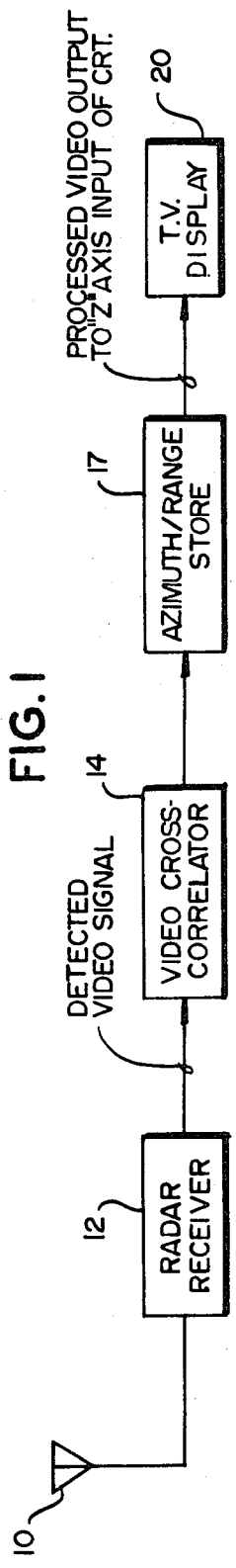
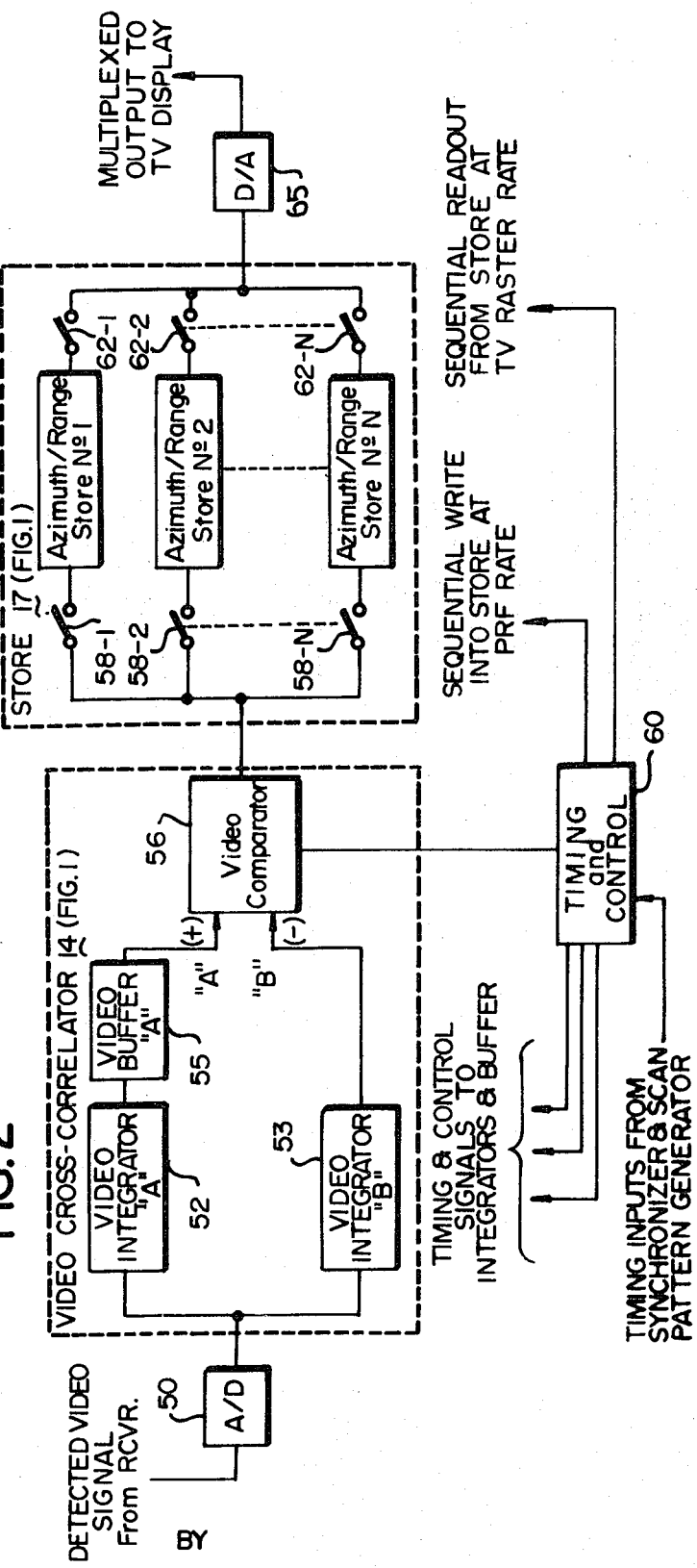

SHORT PERSISTENCE RADAR DISPLAY SYSTEM

BACKGROUND OF THE INVENTION

The present invention is directed toward radar display, or indicator, systems and to postdetection of the return signal.

In the typical radar system, a transmitter generates energy in the form of periodic pulses of very high power and relatively short duration, and these pulses are radiated over a field of interest in accordance with a particular desired scanning method. The pulse energy, or a portion of that energy, is reflected back to the antenna from which it was radiated, from an object or objects in the field of interest, and this return signal is utilized by the radar receiver to obtain such data as range and direction of the illuminated objects.

There are several factors that generally affect radar system performance, including the pulse length and the pulse repetition frequency (PRF). As a general proposition, the pulse should have a sufficiently short duration to resolve individual targets which are relatively closely related in range, or to resolve targets in close proximity to the radar transmitter itself. However, it is known that the noise power and bandwidth of the receiver are inversely proportional to the pulse length, so that in the case of limited peak power the pulse duration must be greater for a greater range. The pulse repetition frequency on the other hand has an upper limit which depends upon the maximum desired range of the system. In essence, there must be a sufficient time interval between successive pulses radiated from the antenna to permit the return of reflected energy to the antenna during that interval. Detection of weak echoes in the presence of receiver noise is enhanced because of recurrence of the echo during each range sweep for successive radar pulses, the noise, of course, being distinguishable because of its nonrecurrent nature and its random character. Thus, emphasis of the echo relative to interfering noise may be accomplished by integration that averages the response over a given interval time. The radar observer's eye, and the persistence of a cathode ray tube screen employed as an indicator, are typical examples of effective integrators of this type. However, if the pulse repetition frequency of the radar system is too low, this integration effect is not fully realizable and may, in fact, be virtually negligible for detection of very weak echoes.

Many of the present day airborne pulsed radar systems utilize low pulse repetition frequencies, and the indicator itself must be capable of providing the desired integration capabilities. In such systems, the received target signal is usually observed on a direct view storage tube (DVST) in a real time display of range versus azimuth of target. However, there are certain advanced radar systems which require operation with several different modes and different sensors and which as a result of the different system requirements must employ a short persistence phosphor cathode ray tube (CRT) to provide a television type display. Frame times on the order of 30 frames per second are typical. The TV-type display generally provides a greater degree of resolution and dynamic range than the DVST, but because of the relatively short persistence time of the conventional TV CRT, useful signal storage or integration capabilities are severely limited in comparison with the DVST.

In those situations where a TV-type display is desirable, time-sharing of the CRT in modes requiring a signal memory (such as in air-to-air search) necessitates the use of a separate memory unit between the detected video output of the radar receiver and the input of the TV display. This need may be met by use of a scan converter tube because of its write-in, readout analog memory capabilities with "natural" input and output data rates commensurate with many types of radar input and TV output data rates. However, the scan converter tube has limited dynamic range and resolution, and therefore reduces the effectiveness of those qualities of the CRT in the TV-type display. Moreover, the scan converter tube is sensitive to shock and vibration, particularly of those magnitudes which are typically found in airborne systems.

Because of the disadvantages of the scan converter system, the time sharing of the TV display between the modes for which the short persistence is suitable and those modes which require signal memory might be handled instead by a purely digital memory along with the use of suitable analog-to-digital and digital-to-analog converters. The principal disadvantage of such a solution, which is admittedly rather simple, is the need for a vast amount of hardware for the memory and memory output processing systems.

Accordingly, it is the principal object of the present invention to provide a substantial improvement in signal-to-noise detection in a range gated pulse radar. Consistent with the above object it is a further object of the invention to provide apparatus for matching the information input of the radar to a TV-type, short persistence phosphor CRT display.

Still another object of the present invention is to provide a method and apparatus consistent with the aforementioned objects while maintaining the amount of hardware required at reasonable levels, well below that amount required in typical present day digital memory techniques utilized in many radar scan modes.

SUMMARY OF THE INVENTION

The above and other objects which will become clear from a consideration of the ensuing detailed description, are attained in accordance with the present invention by utilization of a video cross-correlator in combination with azimuth-range storage to achieve the desired reduction in memory and output data processing hardware. The video cross-correlation process employs post detection integration, and, as previously noted, an integration process that averages the successive return pulses over a period of time serves to emphasize that response relative to interfering noise which is random in character. Accordingly, improved signal-to-noise detection is obtained with a TV-type display utilizing a short persistence screen and without the requirement that the eye of the observer serve as the integrating device.

BRIEF DESCRIPTION OF THE DRAWING

FIG. 1 is a simplified block diagram of a postdetection and display system according to the invention;

FIG. 2 is a more detailed block diagram of the system of FIG. 1;

DESCRIPTION OF THE PREFERRED EMBODIMENT

Figure 3:
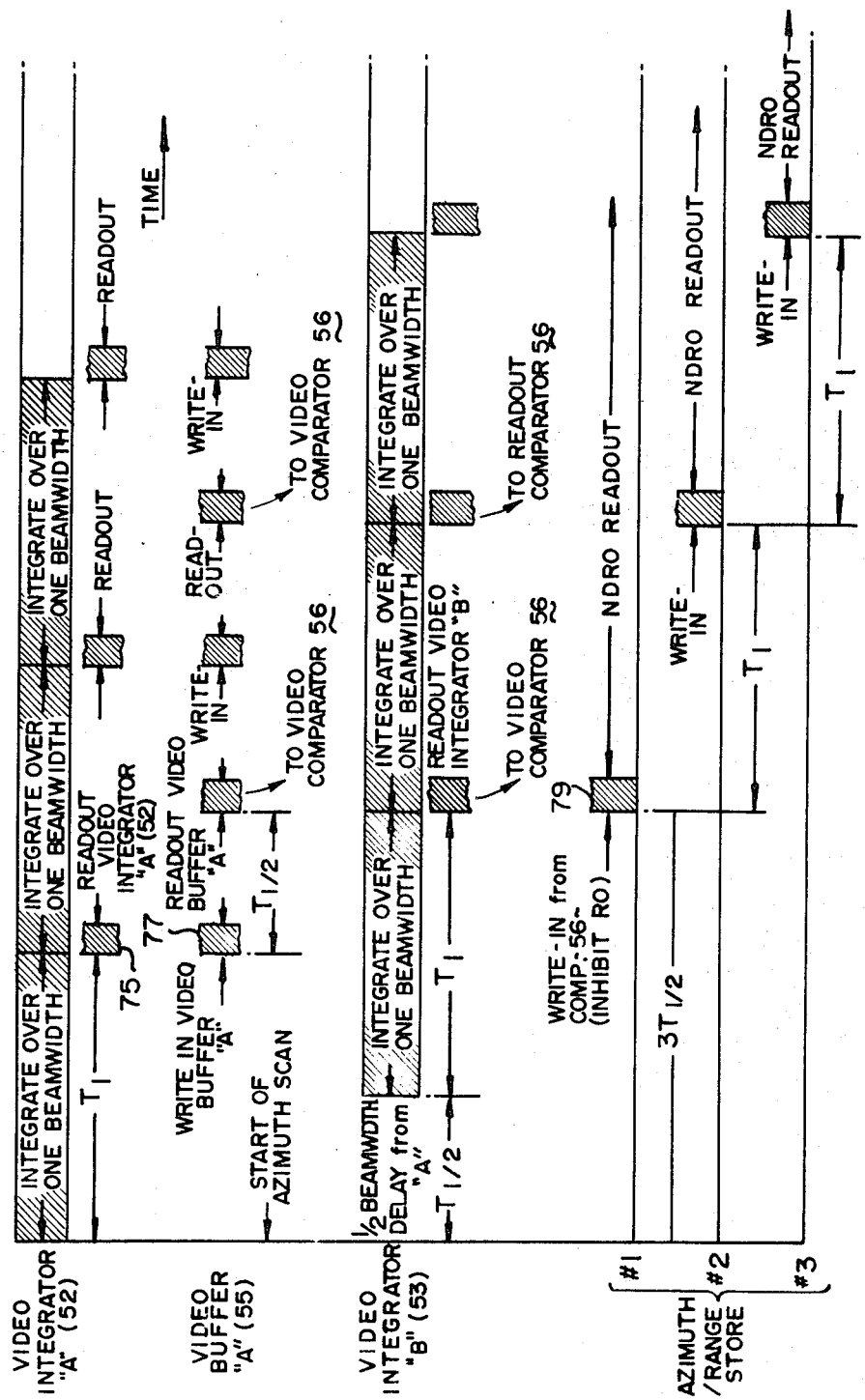
FIG. 3 is a timing diagram useful in explaining the operation of the system of FIG. 2.

The basic components of a system according to the present invention, and the interrelationship of those components, is shown in FIG. 1. The radar return signal, or received target signal, is incident on receiving antenna 10 and is then supplied (e.g., via a duplexer) to the radar receiver 12. The radar receiver is typically an RF receiver of high sensitivity, low noise figure, and appropriate bandwidth, and ordinarily supplies the detected video signal to an appropriate indicator such as a CRT display whose sweep voltage is synchronized with the transmitted pulses of the radar.

The present invention is used in conjunction with an indicator in the form of a short persistence phosphor CRT which provides a television-type of display, of greater resolution and dynamic range than is available with a direct view storage tube (DVST), for example, but of insufficient persistence to permit useful signal storage or integration. In order to obtain the latter capabilities, the detected video signal from radar receiver 12 is supplied to additional system hardware, but less, by a factor of five to 10, than the total amount of storage and output hardware heretofore required in known digital memory schemes, such as those used in radar air-to-air search mode. In FIG. 1, the detected video signal is supplied to a video cross-correlator 14 which, as the name indicates, serves to determine the extent to which that signal is similar to a time-displaced replica, or substantial replica, of itself. In essence, the output of video cross-correlator 14 represents the enhanced signal to noise energy in a beamwidth of the radar antenna pattern, for the received signal. This information is then stored in a storage unit (or simply, a "store") 17 for subsequent display on the short persistence CRT indicator 20.

With reference now to FIG. 2, showing preferred embodiments and arrangements of the video cross-correlator 14 and the azimuth/range store 17 within the environment of the overall system, the detected video signal from the receiver is supplied to an analog-to-digital (A/D) converter 50 which converts that signal to an equivalent binary number. That is to say, the output of A/D converter 50 is a sequence of $n$-bit digital words, each word representing the magnitude of a respective sample of the detected video signal. The actual quantization of the incoming signal will, of course, depend on the particular application. The output of A/D converter 50 is supplied to video cross-correlator 14, which, as shown in FIG. 2, comprises a pair of integrators 52, 53, connected for parallel receipt of the digital words.

Each integrator 52, 53 is controlled, by use of timing signals to be described presently, to integrate its input over a period of time equal to a beamwidth, although "B" integrator 53 is delayed in operation by one-half beamwidth from the operation of "A" integrator 52. The reason for instituting this delay is that the phenomenon of "beam straddling," which constitutes a worst case possibility that only half the target will be illuminated during the arbitrarily chosen integration time, otherwise results in a rather substantial detection loss. By using two video integrators and delaying one relative to the other by one-half beamwidth, the average signal detection loss attributable to beam straddling is substantially reduced. While more than two integrators, appropriately displaced in operation, could be utilized to further reduce this loss, a compromise must be reached between extent of such loss that will be allowed and amount of hardware which can be tolerated. As previously discussed, one important objective of the present invention is a substantial reduction in the hardware required for prior art systems; hence the use of only two video integrators is preferred, to conserve hardware.

As a consequence of the half beamwidth delay between integrators, a video buffer 55 is utilized in the "A" channel of correlator 17 as a temporary store to effectively eliminate the time displacement between the "A" and "B" outputs prior to comparison thereof in video comparator 56. This permits a comparison of the outputs of the two integrators 52, 53 every beamwidth time, the larger of the two integrator outputs representing the maximum signal-to-noise energy within a beamwidth and constituting the output of comparator 56. The "A" output or the "B" output, depending upon which is the greater, is fed into azimuth/range store no. 1 via an input switch 58-1 which is normally open but which is closed during the interval in which an output is supplied from comparator 56 for the first beamwidth under observation, by timing signals from control unit 60. Identical azimuth/range stores, nos. 2, 3,..., N are connected in parallel via respective input switches 58-2, 58-3,..., 58-N, to receive the output of comparator 56, but their respective input switches are closed in sequential, commutating fashion so that each store retains an output of the comparator corresponding to a distinct and different beamwidth. Since there are many azimuth quanta scanned in a beamwidth, the process of integration over a beamwidth followed by storage of the result, as described above, permits a substantial reduction of storage hardware over prior art systems, with but a very modest increase in signal processing hardware.

The overall azimuth/range store 17 is basically a nondestructive memory which is to be readout once each frame time of the TV format, for display purposes. To that end, the contents of the individual azimuth/range stores, nos. 1, 2, 3,..., N, are outputted nondestructively and sequentially at the TV raster rate via respective output switches 62-1, 62-2,..., 62-N, in accordance with timing signals from control unit 60. Similarly, the sequential write-in data into the several stores of the PRF rate provides a sequential updating of these stores each time a complete azimuth scan is made by the antenna. As an inherent consequence of this operation, some scan-to-scan integration is performed, which is desirable. While memory mechanization for azimuth/range store 17 may be accomplished by any of a large number of conventional techniques, the use of a three-dimensional magnetic core matrix or array relying on coincident currents is preferred. In a typical organization, the azimuth cells of the memory may be arranged in the X-direction (rows) and the range cells in the Y-direction (columns) for each possible bit of an $n$-bit word. An entire $n$-bit word, then, is stored in cells occupying n positions in the Z-direction. Write-in may be on the basis of one azimuth at a time for all range cells, and readout may be on the basis of one range cell at a time for all azimuths.

The digital data sequentially read from the stores during sequential closure and reopening of switches 62-1, 62-2,..., 62-N, is supplied to a digital-to-analog (D/A) converter 65 for conversion back to analog form, suitable for application to the short persistence CRT for the desired TV display.

The timing imparted by control unit 60 is most clearly understood by reference to the timing diagram of FIG. 3. Basic timing information is supplied as inputs to the control unit from the standard synchronizer and scan pattern generator of the radar system. This information is then utilized, by well-known implementation techniques, to provide timing signals as shown in FIG. 3. Video integrator "A" (52) is directed to integrate its input for an interval of time T1 corresponding to one beamwidth, and immediately thereafter, over a substantially shorter interval 75, to read out the results of that integration. All timing is initiated with the start of the azimuth scan of the radar antenna, and accordingly, at that moment the operation of video integrator "A" is begun. During an interval 77 corresponding identically in timing and length to interval 75, the result of the integration by integrator 52, as read out from the latter, is written into video buffer "A" (55). The operation of video integrator "B" (53) is initiated after a time delay T1/2 corresponding to one-half beamwidth from the start of azimuth scanning, and hence, one-half beamwidth after the initiation of integration by integrator "A" (52). Video integrator "B" (53) integrates its input over an interval T1 corresponding to one beamwidth, and at the conclusion of that interval (a total of 3 T1/2 from the start of scan) the result of that integration is read out for entry into video comparator 56. Simultaneously with the readout of integrator "B," the contents of buffer "A" are read out and entered into comparator 56. During the interval 79 comparison of results "A" and "B" is effected and the output of the comparator is written into azimuth/range store no. 1. At the conclusion of interval 79, during which readout from the store is inhibited, a nondestructive readout (NDRO) of the contents of store no. 1 is effected.

Slight consideration of the timing diagram of FIG. 3 will clearly indicate that a similar set of events, governed by similar timing, results in the entry into and NDRO from azimuth range store no. 2 of respective integration maxima over a beamwidth, and so forth for store no. 3 through store no. N, the entire sequence repeating upon the completion of a complete azimuth scan and the start of the next scan.

Figure 4:
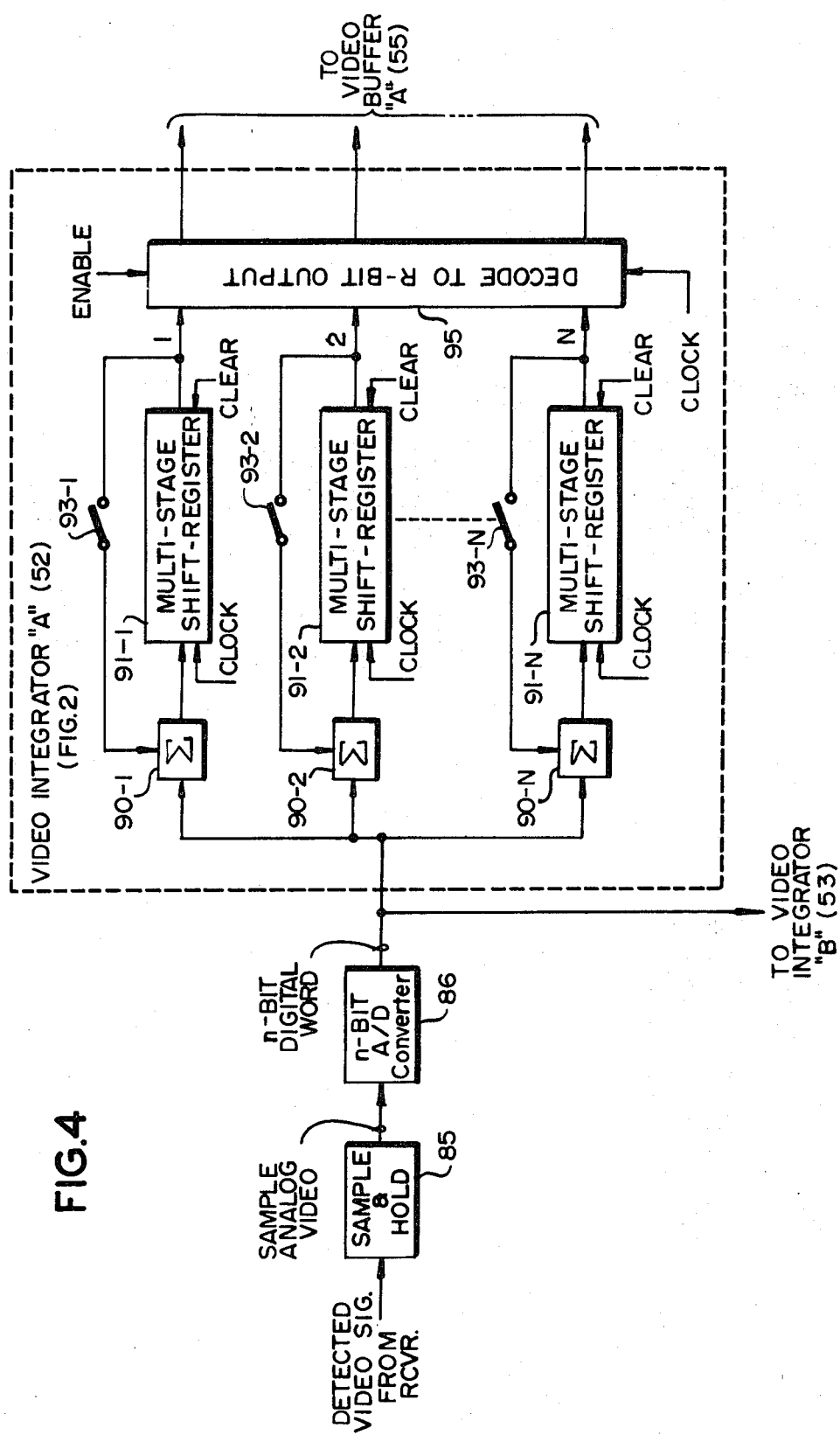
FIG. 4 is a more detailed block diagram of one of the components of the system of FIG. 2.

An exemplary embodiment of a video integrator suitable for use as either integrator 52 or 53, is shown in FIG. 4. Prior to application to the integrator, the detected video signal from the receiver is sampled to provide an analog video sample at the output of sample and hold circuit 85. The sampling may be achieved by multiplying the video signal with timed impulses. Each sample is fed to A/D converter 86 which generates an $n$-bit digital word representative of the respective analog sample. The $n$-bit digital word is applied in parallel to video integrators "A" and "B" (52 and 53). Although only integrator "A" is shown in detail in FIG. 4, integrator "B" is identical (except that its output is supplied directly to comparator 56 rather than initially to a buffer, for timing reasons previously explained) and hence need not be shown.

Each integrator is implemented using N independent adder registers of the type to be described below, where N is the number of azimuth beamwidths. Each of these N adder registers has a capacity of M range cells, and each cell will contain the sum of P pulses accumulated in a beamwidth, at the end of a beamwidth. To that end, each integrator comprises a plurality of circuits each including an adder 90 and a multiple stage shift register 91, with the inputs of all of these circuits connected in parallel. The output of each adder 90 is supplied to the respective shift register 91 in its circuit. Each adder-register circuit is also provided with a feedback path containing a respective switch 93 to supply the output of the shift register back to an input terminal of the respective adder.

Each shift register acts as a delay line, with the number of delays equal to the required number of range resolution elements for the radar. The maximum number of stages for each shift register is equal to the inverse of the pulse repetition frequency (PRF), i.e., the PRF time, divided by the pulse width utilized in the radar system. In effect, each delay within a shift register constitutes a range gate related in timing to the propagation velocity of the transmitted radar signal. Switches 93-1, 93-2,..., 93-N, are closed during the integration interval (a beamwidth time), and adders 90-1, 90-2,..., 90-N, are employed to provide integration of the target return signal over the beamwidth time. At the conclusion of the integration interval, switches 93-1, 93-2,..., 93-N, are opened (by use of appropriate timing signals from control unit 60) and the shift registers are read out for application of the results of the integration to a decoder 95 which is enabled, again by appropriate timing signal, to produce therefrom an R-bit output representing signal-to-noise energy within a beamwidth of the radar antenna pattern. The purpose of the decoder is basically to truncate and round off the word lengths developed in the integrator.

As previously observed, in the case of video integrator "A," the R-bit output is supplied to buffer 55 for temporary storage or delay, so that the outputs of both integrators will be supplied simultaneously to comparator 56, despite the half-beamwidth time delay of integrator "B" relative to integrator "A." Thus, the output of the comparator constitutes the enhanced signal-to-noise energy within the beamwidth under consideration, as obtained by integration of the incoming video samples while taking into account the adverse effect of beam straddling of the target.

All samples obtained over a beamwidth are applied successively to A/D converter 86, and thence to successive adder-register circuits in the form of $n$-bit digital words, over a complete integration period.

The overall system described above effectively performs the functions of video cross-correlation and storage in a low PRF radar unit, thereby permitting the use of a TV-type display for the system output, while simultaneously therewith providing enhanced signal detection over that obtainable with prior art systems, such as that using the direct view storage tube. A comparison of a system constructed in accordance with the present invention, and a conventional present-day system utilizing a DVST, under similar or identical conditions, demonstrated an average net signal enhancement of 6.9 db. with the present invention when using only one integrator (i.e., no compensation for possible beam straddling) and of 7.6 db. when using two integrators.

While we have disclosed a preferred embodiment of our invention, it will be apparent to those skilled in the art to which the invention pertains, from a consideration of the foregoing description, that variations in the specific details of construction which have been shown and described may be resorted to without departing from the spirit and scope of our invention.

We claim as our invention:

1. In a radar system in which pulses are periodically radiated from an antenna having a radiation pattern of known beamwidth, and a return signal is incident on said antenna in response to illumination of a target by all or part of said beamwidth during azimuth scan by said antenna, the combination comprising:

means responsive to video signal detected from said return signal for correlation thereof with a signal of preselected characteristics to obtain a measure of enhanced signal-to-noise energy within each said beamwidth during a complete azimuth scan, means responsive to each said measure of enhanced signal-to-noise energy corresponding to each beamwidth of said complete azimuth scan for respective storage of each said measure and for sequentially updating the stored values during each successive complete azimuth scan by said antenna, timing means for synchronizing the operation of said correlation means and said storage means for entry of a measure of signal-to-noise energy obtained for a particular beamwidth into a respective storage location associated with that beamwidth, a television display including a cathode-ray tube having a short persistence time, and means further responsive to said timing means for sequentially reading the signal-to-noise energy measures from the respective storage locations of said storage means at the raster rate of said television display for application to said cathode-ray tube.

2. The combination according to claim 1 further including means responsive to samples of said video signal detected from said return signal for conversion thereof from analog to digital form prior to said correlation thereof, and means responsive to the digital format read from said storage means for conversion to analog form prior to said application to said cathode ray tube.

3. The combination according to claim 2 wherein said correlation means comprises video integration means responsive to digital representations of said video signal samples for integration thereof over a time interval corresponding to one beamwidth of the azimuth scan.

4. The combination according to claim 3 wherein said video integration means comprises a plurality of distinct integrators for receiving all of said digital representations, and said timing means introduces a time displacement in the integration of all said digital representations as performed by each of said integrators in accordance with the number of said integrators.

5. The combination according to claim 4 wherein said plurality of integrators consists of two integrators, one of which is displaced in time of operation from the other by an amount corresponding to one-half beamwidth.

6. The combination according to claim 5 further including means responsive to the outputs of both said integrators for comparison thereof to select the largest as the measure of the maximum signal-to-noise energy in the beamwidth during which both outputs were obtained.

7. A radar display system for presenting on a television screen having a short persistence time of producing a visible glow in response to impingement of an electron beam thereon, a visual representation of the radar return signal from a target in a beamwidth of the radar antenna pattern during an azimuth scan of the antenna, said system comprising means responsive to the radar return signal for detection of video signal therefrom, means responsive to the detected video signal for sequential sampling thereof, means responsive to each sample of the video signal for conversion thereof to a representative digital number, means responsive to the digital numbers for integration thereof over each beamwidth of said scan to obtain respective digital signal-to-noise energy measurements, means for selectively storing each signal-to-noise energy measurement for each beamwidth for sequential readout at a predetermined rate compatible with said television screen display, and means responsive to the digital measurements read from said storing means for conversion to analog form to control said display.

8. The system defined by claim 7 further including means for coordinating the operational timing of said integration means and of the storing and readout of said storing means in accordance with the timing of the azimuth scan of said antenna.

9. The system defined by claim 8 wherein said integration means includes a first integrator and a second integrator, said first and second integrators connected to integrate the digital numbers produced by said conversion means, said second integrator being delayed by said time coordinating means to integrate digital numbers occurring one-half beamwidth after those integrated by said first integrator, and means responsive to the digital outputs of both said integrators for one beamwidth for selecting the larger of those outputs as representing the maximum signal-to-noise energy in the last-named beamwidth, for application to said storing means.

10. The system defined by claim 9 wherein said storing means comprises a plurality of distinct stores, each for retaining a signal-to-noise energy measurement corresponding to a respective beamwidth over a complete azimuth scan, and switch means for each of said stores for entry and readout of digital data from said integration means and to said display, respectively.

11. The system defined by claim 10 wherein each of said stores is constructed and arranged to provide nondestructive readout of its contents, for updating its respective contents over successive complete azimuth scans of said antenna.

\* \* \* \* \*